United States Patent
Tse

(10) Patent No.: US 8,952,656 B2
(45) Date of Patent: Feb. 10, 2015

(54) BATTERY CHARGING STATION

(75) Inventor: David YuanJei Tse, Woodside, CA (US)

(73) Assignee: Atieva, Inc., Redwood City, CA (US)

( * ) Notice: Subject to any disclaimer, the term of this patent is extended or adjusted under 35 U.S.C. 154(b) by 882 days.

(21) Appl. No.: 13/021,007

(22) Filed: Feb. 4, 2011

(65) Prior Publication Data

US 2012/0200256 A1    Aug. 9, 2012

(51) Int. Cl.
    *H02J 7/00*       (2006.01)
    *B60L 11/18*    (2006.01)

(52) U.S. Cl.
CPC ........... *H02J 7/0013* (2013.01); *B60L 11/1844* (2013.01); *Y02T 10/7088* (2013.01); *Y02T 10/7005* (2013.01); *Y02T 90/163* (2013.01); *Y02T 90/14* (2013.01); *Y02T 90/128* (2013.01); *Y02T 10/7055* (2013.01); *Y04S 10/126* (2013.01); *Y02S 20/224* (2013.01); *Y02E 60/721* (2013.01)
USPC .......................................... 320/109; 320/104

(58) Field of Classification Search
USPC .................................. 320/104, 109, 119, 125
See application file for complete search history.

(56) References Cited

U.S. PATENT DOCUMENTS

| | | | |
|---|---|---|---|
| 5,202,617 A | 4/1993 | Nor | |
| 5,306,999 A | 4/1994 | Hoffman | |
| 5,449,995 A | 9/1995 | Kohchi | |
| 5,548,200 A | 8/1996 | Nor et al. | |
| 5,574,354 A | 11/1996 | Kohchi | |
| 5,583,418 A | 12/1996 | Honda et al. | |
| 5,773,954 A | 6/1998 | Vanhorn | |
| 5,847,537 A | 12/1998 | Parmley, Sr. | |
| 6,225,776 B1 | 5/2001 | Chai | |
| 7,457,649 B1 | 11/2008 | Wilson | |
| 8,013,569 B2 | 9/2011 | Hartman | |
| 2002/0195989 A1 | 12/2002 | Teramoto | |
| 2003/0120442 A1 | 6/2003 | Pellegrino et al. | |
| 2006/0229112 A1 | 10/2006 | Forro | |
| 2010/0013433 A1 | 1/2010 | Baxter et al. | |
| 2010/0013434 A1 | 1/2010 | Taylor-Haw et al. | |
| 2010/0013435 A1 | 1/2010 | Tu | |
| 2010/0017249 A1* | 1/2010 | Fincham et al. ................ 705/8 |
| 2010/0225475 A1 | 9/2010 | Karch et al. | |
| 2010/0301809 A1 | 12/2010 | Bhade et al. | |
| 2011/0015814 A1 | 1/2011 | Starr et al. | |
| 2011/0066515 A1 | 3/2011 | Horvath et al. | |
| 2011/0106329 A1 | 5/2011 | Donnelly et al. | |
| 2011/0133689 A1 | 6/2011 | Uchihashi et al. | |
| 2011/0133693 A1 | 6/2011 | Lowenthal et al. | |
| 2011/0140656 A1 | 6/2011 | Starr et al. | |
| 2011/0191265 A1 | 8/2011 | Lowenthal et al. | |
| 2011/0204847 A1 | 8/2011 | Turner | |
| 2011/0208953 A1 | 8/2011 | Solomon et al. | |

(Continued)

FOREIGN PATENT DOCUMENTS

| | | | |
|---|---|---|---|
| WO | 2010074856 A | 7/2010 | |
| WO | 2010096502 A | 8/2010 | |

(Continued)

*Primary Examiner* — Edward Tso
*Assistant Examiner* — Aaron Piggush
(74) *Attorney, Agent, or Firm* — Womble, Carlyle, Sandridge & Rice, LLP

(57) ABSTRACT

A method of operating an electric vehicle charging system utilizing a plurality of charging units and charging points is disclosed. The method includes determining a rate of charge to be delivered to each vehicle and then allocating a respective portion of the total charging capacity of the charging station to each vehicle.

20 Claims, 7 Drawing Sheets

(56) References Cited

U.S. PATENT DOCUMENTS

| | | |
|---|---|---|
| 2011/0213656 A1 | 9/2011 | Turner |
| 2011/0267003 A1 | 11/2011 | Bercovici |
| 2011/0271031 A1 | 11/2011 | Bercovici |

FOREIGN PATENT DOCUMENTS

| | | |
|---|---|---|
| WO | 2010107905 A | 9/2010 |
| WO | 2011079215 A | 6/2011 |
| WO | 2011094627 A | 8/2011 |
| WO | 2011117430 A | 9/2011 |
| WO | 2011138059 A | 11/2011 |
| WO | 2011139680 A | 11/2011 |
| WO | 2011156776 A | 12/2011 |
| WO | 2012004019 A | 1/2012 |
| WO | 2012012023 A | 1/2012 |

\* cited by examiner

| Power (kW) | 10 | | | 50 | | | 100 | | | 150 | | | 200 | | |
|---|---|---|---|---|---|---|---|---|---|---|---|---|---|---|---|
| Priority | Low | Med | High | Low | Med | High | Low | Med | High | Low | Med | High | Low | Med | High |
| 0.1 | $1 | $5 | $10 | $2 | $6 | $11 | $3 | $7 | $12 | $4 | $8 | $13 | $5 | $9 | $14 |
| 0.2 | $2 | $6 | $11 | $3 | $7 | $12 | $4 | $8 | $13 | $5 | $9 | $14 | $6 | $10 | $15 |
| 0.3 | $3 | $7 | $12 | $4 | $8 | $13 | $5 | $9 | $14 | $6 | $10 | $15 | $7 | $11 | $16 |
| 0.4 | $4 | $8 | $13 | $5 | $9 | $14 | $6 | $10 | $15 | $7 | $11 | $16 | $8 | $12 | $17 |
| 0.5 | $5 | $9 | $14 | $6 | $10 | $15 | $7 | $11 | $16 | $8 | $12 | $17 | $9 | $13 | $18 |
| 0.6 | $6 | $10 | $15 | $7 | $11 | $16 | $8 | $12 | $17 | $9 | $13 | $18 | $10 | $14 | $19 |
| 0.7 | $7 | $11 | $16 | $8 | $12 | $17 | $9 | $13 | $18 | $10 | $14 | $19 | $11 | $15 | $20 |
| 0.8 | $8 | $12 | $17 | $9 | $13 | $18 | $10 | $14 | $19 | $11 | $15 | $20 | $12 | $16 | $21 |
| 0.9 | $9 | $13 | $18 | $10 | $14 | $19 | $11 | $15 | $20 | $12 | $16 | $21 | $13 | $17 | $22 |
| 1 | $10 | $14 | $19 | $11 | $15 | $20 | $12 | $16 | $21 | $13 | $17 | $22 | $14 | $18 | $23 |
| 2 | $20 | $28 | $38 | $22 | $30 | $40 | $24 | $32 | $42 | $26 | $34 | $44 | $28 | $36 | $46 |
| 3 | $30 | $42 | $57 | $33 | $45 | $60 | $36 | $48 | $63 | $39 | $51 | $66 | $42 | $54 | $69 |

Total Charging Time (Hours)

Fig. 7

BATTERY CHARGING STATION

FIELD OF THE INVENTION

The present invention relates to battery charging systems.

BACKGROUND

With the increase in popularity of electric and hybrid vehicles that utilize rechargeable battery systems for at least a portion of their power source, the need for charging stations to recharge these battery systems is increasing. Although most battery systems can be recharged from a domestic wall socket, many support faster charging at higher voltages and currents which requires more expensive dedicated equipment with specialized connectors. Some systems may use 240 Volt AC or 500 Volt DC high-current to provide greatly accelerated charging.

BRIEF DESCRIPTION OF THE DRAWINGS

The present invention is illustrated by way of example, and not limitation, in the figures of the accompanying drawings and in which like reference numerals refer to similar elements and in which:

FIG. 7 provides an example of a table showing the relationship between charging priority and price paid.

DETAILED DESCRIPTION

In various embodiments disclosed herein, an electric vehicle charging station is described that utilizes a plurality of dynamically allocated charger units and charger points to provide a number of benefits including, without limitation, a) increasing the utilization and efficiency of the available charging capacity of the charging station, b) increasing the number of vehicles that may be using the charging station at any one time, c) providing more options (including dynamically determined options) to the operators of the vehicles using the charging station regarding charging time, cost, and other factors, and d) allowing for easier maintenance of the charging station, and so forth.

Figure 1:
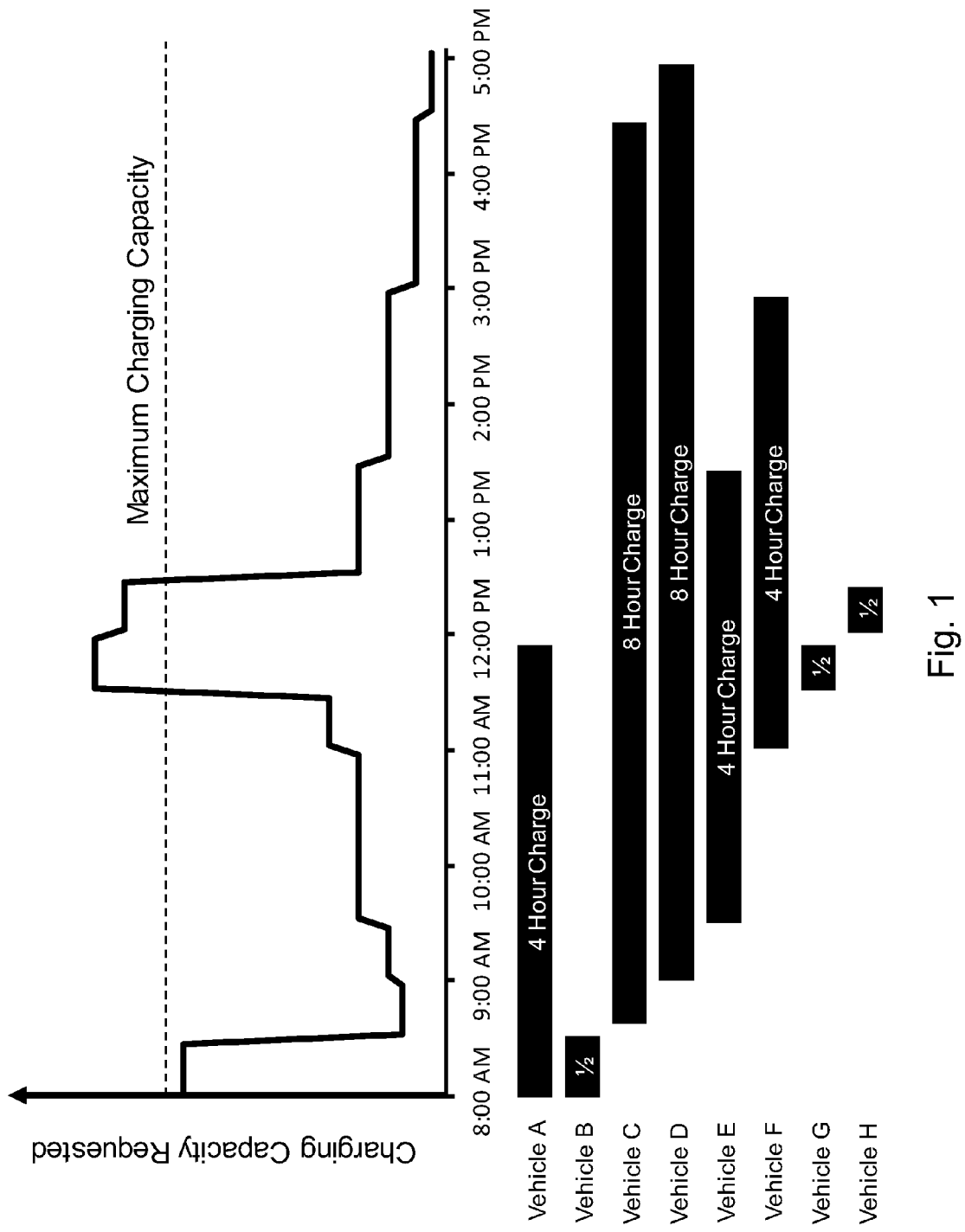
FIG. 1 illustrates an exemplary chart showing a how charging capacity demand changes over time for a public electric vehicle charging station.

Depending on the needs of the vehicle operator and the current state-of-charge of the battery system, the power required to charge a vehicle may vary by more than an order of magnitude. For example, a battery system requiring a 30 minute charge may require 16 times the power of a similar battery system in a similar state-of-charge requiring an 8 hour charge. An example of the charging demand profile for an electric vehicle charging station is shown in FIG. 1. While the charging station is easily able to accommodate the power requirements of several attached vehicles with longer required charging periods, the high power demand of 2 vehicles requiring a very short charging period during the mid-day time period causes the charging station to exceed its available charging capacity.

Figure 2:
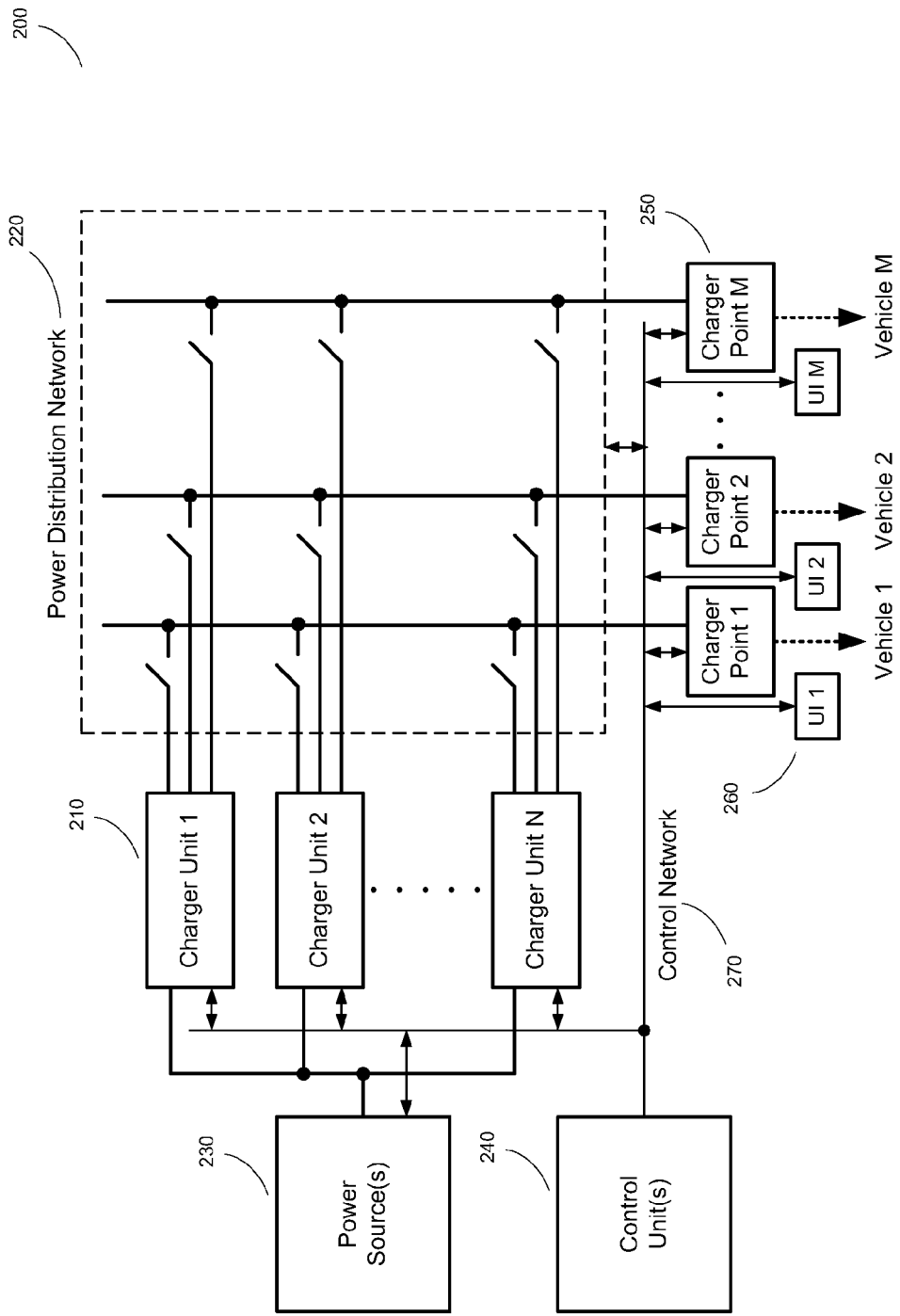
FIG. 2 illustrates one embodiment of an electric vehicle charging station that provides increased charging capacity utilization and increased vehicle capacity.

FIG. 2 illustrates one embodiment of an improved charging station 200. A plurality of power sources 230 provide power to a plurality of charger units 210 that regulate the power and then deliver it via a power distribution network 220 to plurality of charger points 250 that are in turn coupled a plurality of vehicles requiring charge. The power source provides power to the charger units. The form of the power (e.g., AC or DC, low or high voltage, or other forms) delivered by the power source may vary depending on the specific needs of the local environment and the type and availability of external power for the system. Some charging stations may be coupled to a national or local grid. Others may be coupled to solar panels, wind turbines, self-contained generators (e.g., combustion engines), or other forms and combinations of energy supply. The power sources may be physically adjacent to the charger units, or they may be in one or more remote locations. The charger units convert energy from the power sources, using energy conversion techniques such as, but not limited to, DC to DC conversion, AC to DC conversion, DC to AC conversion, AC to AC conversion, current limiting and voltage regulation, as determined, at least in part, by the charging requirements of the vehicle that is using power from the charger unit and/or requirements of the vehicle operator (e.g., the vehicle driver, owner, custodian or other person available to specify such requirements). Power provided from the charger unit may vary over time as necessary to improve factors including, but not limited to, charger unit efficiency, charge time, battery life and charging cost to the vehicle operator.

One or more control units 240, referred to collectively herein as "the control unit" manage the process of delivering power to the vehicles using the system. The control unit is coupled to the other components of the charging station using a control network 270 which may consist of a shared communication bus, point to point network, wireless network (e.g., Wi-Fi, Bluetooth, Cellular, etc.) or other form of communication mechanism or combination of communication mechanisms. The control unit may be physically co-located with the other components of the charging station, or remotely located (e.g., in a centralized data processing center that manages power delivery in multiple charging stations 200. The control unit monitors system information from, but not limited to, the power sources, the charger units, the charger points, the vehicle and the vehicle operator to dynamically allocate charger units to charger points and to determine the various power delivery parameters for each vehicle using the system. The charger unit allocation and power delivery parameters may change over time (i.e., dynamically, during the charging interval) in response to changing system information.

Figure 3:
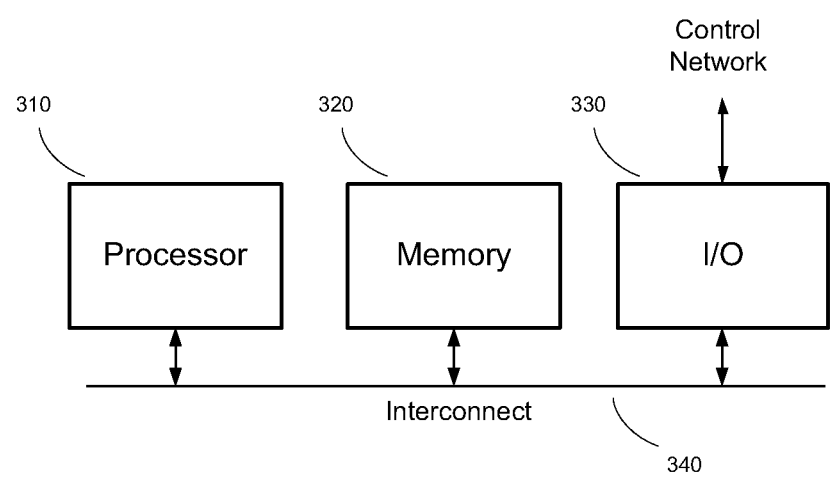
FIG. 3 shows an exemplary system diagram for a control unit.

FIG. 3 depicts an embodiment of a control unit that may be used to implement each or all of the control units of FIG. 2. As shown, the control unit includes a processor 310, memory 320, and I/O block 330 coupled together with an interconnect bus. The control unit may include numerous other functional blocks in addition to or within the functional blocks shown, including a user interface to enable control unit programming, maintenance and system-level data collection. The control unit is capable of executing programmed instructions (e.g., stored within memory 320) to implement various sequences of operations as described herein Referring again to FIG. 2, the power distribution network 220 may be used to connect charger units to charger points as determined by the control unit. Depending on the charging requirements of a vehicle, more than one charger unit may be coupled to a single charger point if the power required by a vehicle exceeds the capacity of a single charger unit. Conversely, if the charging power required by multiple vehicles can be provided by a single charging unit, then multiple charger points may be coupled to a single charger unit. The mechanism for connecting a charger unit to a charger point in the power distribution network may include relays, solid state devices or any other mechanism for delivering electrical power from a power source to a load. Should one or more of the charger units become defective, the control unit may de-allocate and disconnect the charger unit(s) from any charger point(s) to allow the charger unit(s) to be safely replaced while the charging station is in operation. Although the overall capacity of the charging station is reduced by loss of a charger unit, the controller may dynamically re-allocate charger units to charger points so that the station may continue to charge all vehicles using the charging station, though at a potentially reduced rate. The charger point provides a mechanism to connect the vehicle to the charging station. The charger point may require the vehicle operator to physically plug a connector into the car, or it may automatically connect to the car using some predetermined standard mechanism. Associated with the charger point, but not necessarily physically coupled to it, is a UI device 260 that both provides information to and accepts input from the operator of the vehicle regarding the charging of the vehicle. While the UI device may be attached to the charger point, other devices, such as cell phones, operator interfaces or infotainment systems in the vehicle, or other devices, wirelessly or physically coupled to the control unit, may be used to provide information to and receive information from the control units in the charging station.

Figure 4:
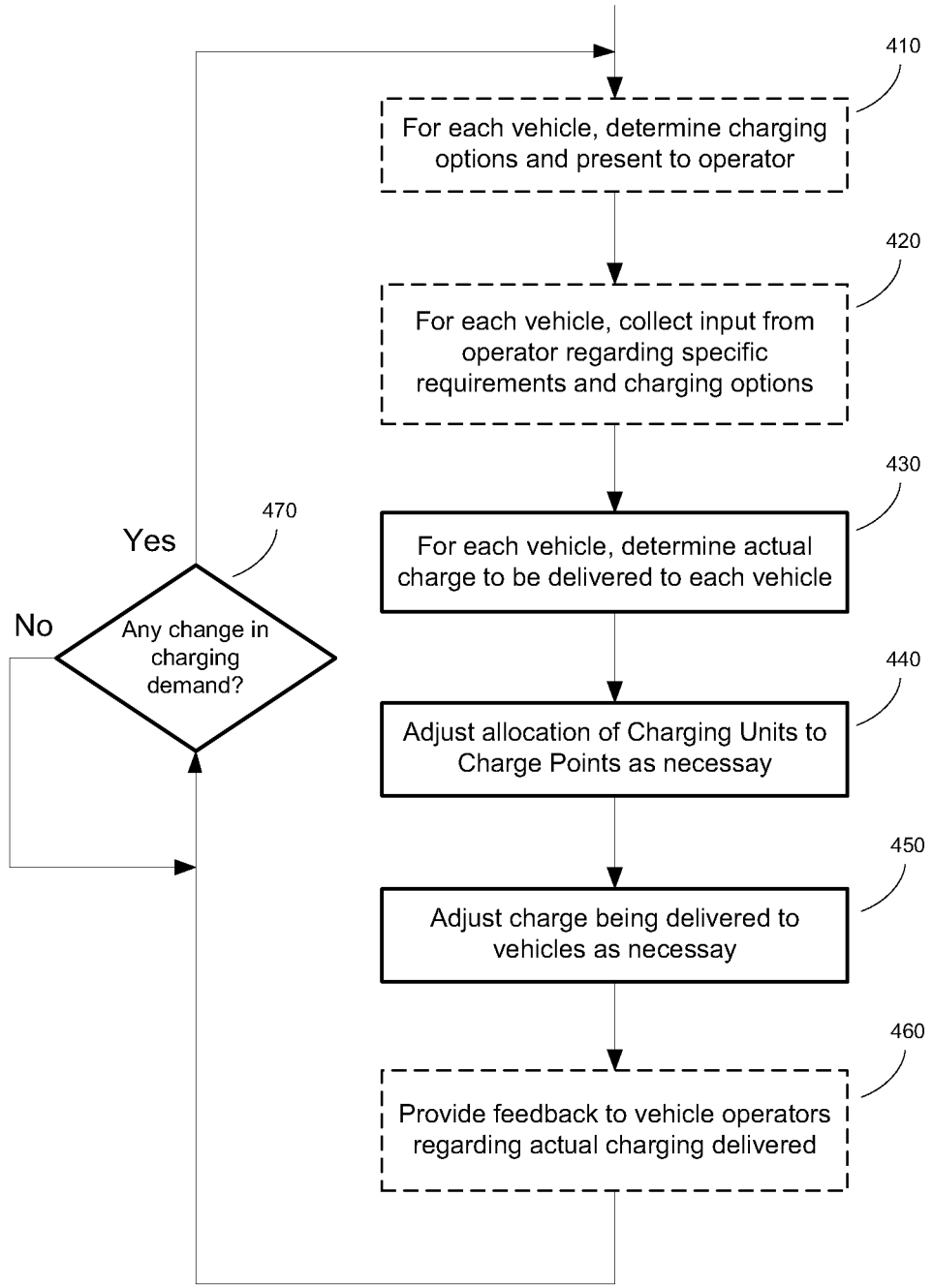
FIG. 4 illustrates an exemplary sequence of operations to manage the allocation of charging capacity to vehicles requiring charge in a charging station.
Figure 5:
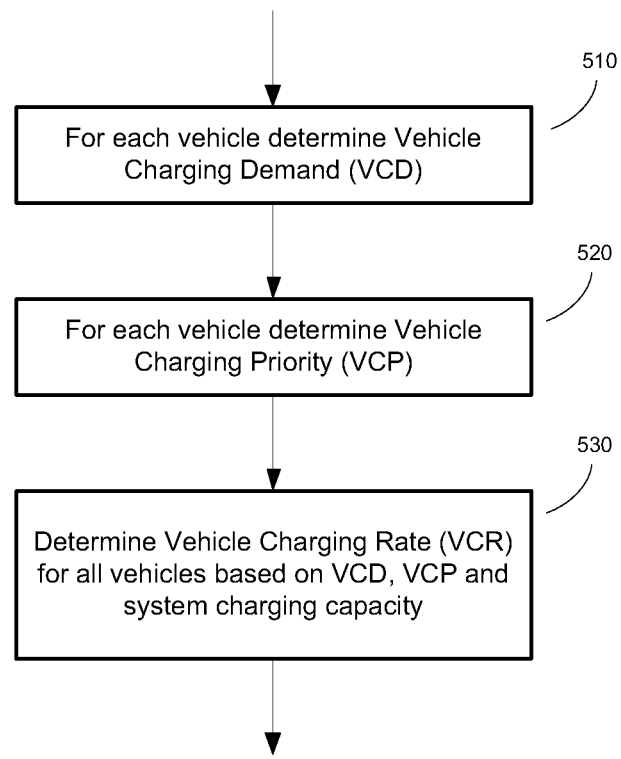
FIG. 5 illustrates an exemplary sequence of operations to determine the allocation of charging capacity to vehicles coupled to a charging station.

FIG. 4 illustrates an exemplary sequence of operations to manage the allocation of charging capacity to vehicles requiring charge in a charging station. The sequence begins at 410, where, optionally, the available charging options are determined and presented to the operator of the vehicle. Such options include, but are not limited to, the charge time, the desired resulting state-of-charge after charging completes, and the cost options available. For example, an operator may be prompted to pay more to charge his/her vehicle in a shorter time or to ensure that the charge time is not extended if additional vehicles have coupled to the charging station and the charging demand now exceeds the available charging capacity of the station. Next, at 420, information is optionally collected regarding operator requirements and options. One embodiment may include the storing of operator-specified preference information, either in a central location, or some other storage, possibly portable, such that the next time the operator charges the vehicle at a charging station having access to the preference information, charging options indicated by the preference information are automatically selected, thereby obviating operator entry of the same information in each charging-station visit reducing the time spent starting the charging process. At operation 430, the charging system determines the actual charge to be delivered to each vehicle. A more detailed example of this operation is shown in FIG. 5 and described below. At 440 the charging system allocates charging units to charge points as necessary to meet the charging requirements from operation 430. (It should be noted that the charging requirements from 430 are maximum requirements, as the vehicle may reduce its requirements over time). Operation 440 may result in one charger unit being coupled to one charger point, multiple charger units being coupled to a single charger point, a single charger unit being coupled to multiple charger points, or any combination of the foregoing. The charger units may also be allocated in such a matter as to improve the overall electrical efficiency (and therefore cost effectiveness) of the charging station. For example, if a charger unit operates at 75% efficiency when loaded at 100% (meaning that 25% of the energy is lost during the conversion) compared to 90% efficiency when loaded at 70%, the whole charging station can operate more economically if the charger units are allocated such that they are loaded at 70%, even if this means that more charger units are in operation. Continuing at operation 450, the charger system adjusts the charge being delivered by the charger units to the charger points to meet the specific needs of the vehicles coupled to the charger points. For example, near the end of the charging process, the power delivered to a vehicle may be reduced or tapered. At 460, the vehicle operator is optionally provided with information, including but not limited to, the actual power being delivered to his vehicle, which may be different, more or less, from the requested power due to changes in demands from other vehicles attached to the system. At operation 470, the system evaluates if there have been any changes in charging demand. This could occur due to various events, including but not limited to, an operator decoupling a vehicle from the charging station, a vehicle being coupled to the charging station, a change in requirements from an operator such as a need for faster charging, or a reduction in charge demand from a specific vehicle because the battery system in the vehicle is reaching a fully charged state. If demand has changed, then the system loops back to 410 and optionally presents vehicle operators with a possibly new set of charging options. If there is no change in charging demand, then the system loops back to reevaluate if any change has occurred.

Figure 6:
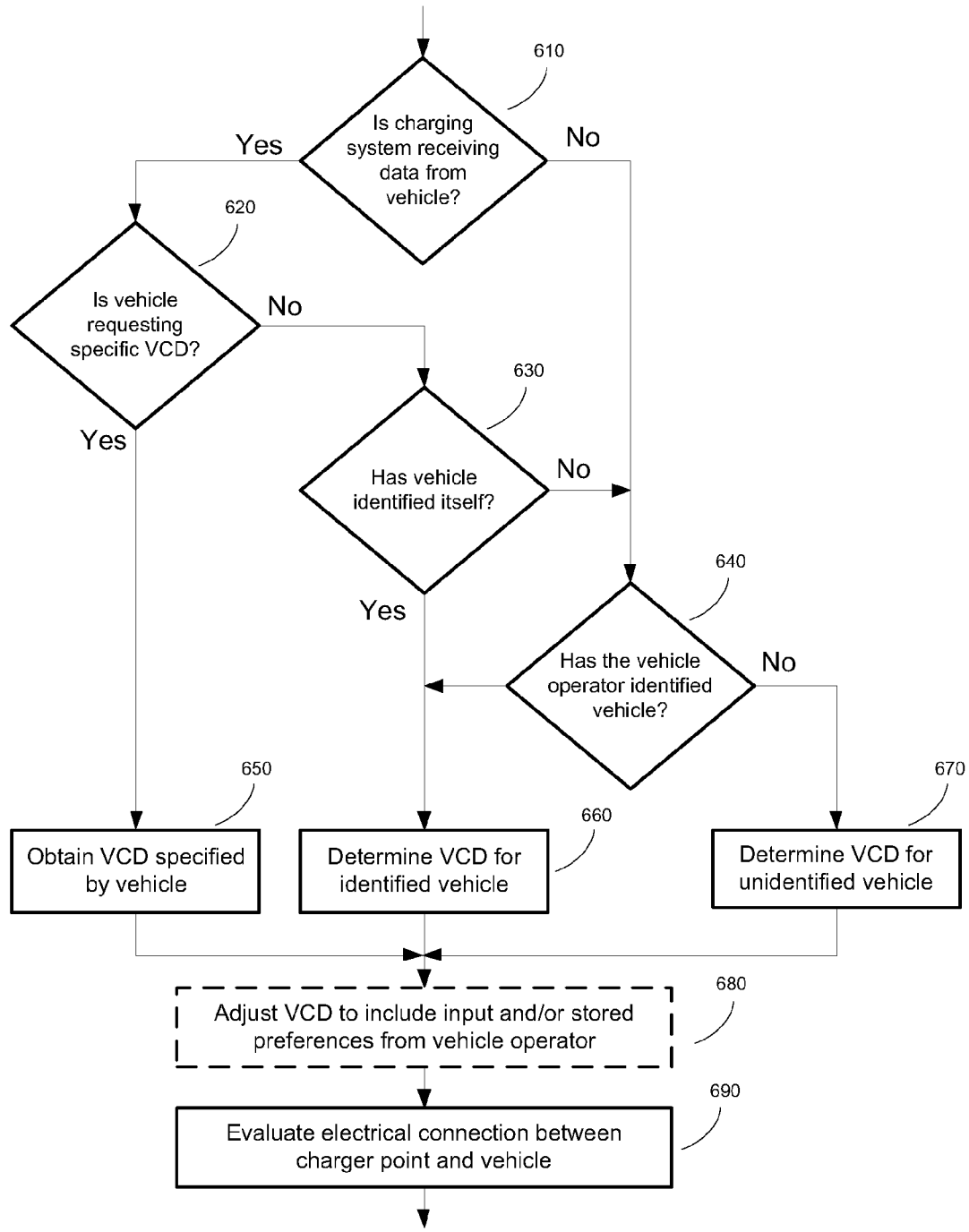
FIG. 6 illustrates an exemplary sequence of operations to determine the charging requirement of vehicles coupled to a charging station.

FIG. 5 illustrates an exemplary sequence of operations that may be executed by the controller to determine the allocation of charging capacity to vehicles coupled to a charging station. The sequence begins at operation 510 where the vehicle charging demand (VCD) is determined for each vehicle. The VCD is a rate of charge that is requested for a vehicle at a particular point in time. This process is shown in FIG. 6 and described in more detail below. Next, at 520, the vehicle charging priority (VCP) is determined. This priority may be determined based on various factors such as the amount the operator is paying, participation in membership programs, the frequency with which the operator uses the charging station, or other factors. The control unit then uses the VCD and VCP and the system charging capacity at operation 530 to determine the vehicle charging rate (VCR) that will be delivered to the vehicle. The VCR is the actual maximum rate of charge that may be delivered to the vehicle. If the sum of all VCDs is less that the capacity of the charging station, then VCR may equal VCD. If not, then VCR may be adjusted based on VCP. Vehicles with higher VCP may receive disproportionally more power than those vehicles with lower VCP. Various techniques may be used to determine the disproportionality, such as determining the priority based on the price paid by the vehicle operator. One embodiment of the relationship between price and priority is shown in the table in FIG. 7. Referring to FIG. 7, if a vehicle operator pays $20 for a one hour 50 KW charge (as represented by 710), that operator's vehicle would have high priority and receive disproportionally more charge (and thus reach a charged state more quickly) than the vehicle of an operator who only pays $11 (as represented by 720) when the total charging demand from all vehicles exceeds the charging station capacity. Whereas if the charging demand did not exceed the charging station capacity, both of the vehicles would receive the same charging power despite the different price paid. In various other embodiments alternate or additional factors may be incorporated to determine disproportionality, including, without limitation, frequency of use of the charging station by an operator, the location, the time of day, and the time of year.

FIG. 6 illustrates one embodiment of a sequence of operations to determine the charging requirement of vehicles coupled to a charging station. Starting at operation 610, it is determined if the charging station is receiving data from the vehicle (either through the charger point or via some other wireless mechanism) to allow the vehicle to request a specific VCD. If the charging station is receiving data from the vehicle, the sequence continues at 620 where it is determined if the vehicle is requesting a specific VCD. In such cases, processors or other devices in the vehicle may be self-determining the VCD based on the current battery system state-of-charge and other environmental factors (e.g., battery temperature, ambient temperature, etc.), and subsequently communicating the self-determined VCD to the charging station. If the vehicle is requesting a specific VCD (i.e., affirmative determination at 620), the sequence continues at operation 650. Otherwise, if the vehicle has identified itself (decision 630), the sequence continues at operation 660, if not the sequence goes to 640. If the operator has identified the vehicle, then the sequence continues at 660, if not the sequence proceeds to operation 670. At operation 650 the VCD is obtained from the vehicle. At operation 660 the VCD is obtained by using stored charging reference data associated with the identified vehicle. This stored reference data, which may contain information regarding changes to the rate of charge with respect to time, battery system state-of-charge, desired charging time and other factors, may be obtained from the vehicle and/or battery system manufacturer, or accumulated from data collected while charging similar vehicles, or from some other source, or calculated based on various measured factors from the vehicle and battery system. At operation 670 the VCD is determined using charging reference data that is not associated with a specific vehicle. In such cases, as the specific vehicle is not known, the charging parameters may be more conservative, and may be based on various measured factors from the vehicle and battery system. Once the VCD has been determined, the sequence goes to 680, where the VCD may be adjusted based on operator input, such as desired cost, charging time and other factors. Next at 690, the electrical connection between the charger point and the vehicle is evaluated. Parameters that may be checked include, but are not limited to, the type of connection (different power levels may require different connections) and the quality of the connection (i.e. the power transfer efficiency, safety). As a result of the checks in 690, the UI may present information to the operator such that appropriate adjustments may be made if necessary.

The charging station described in the foregoing increases the utilization of the available charging capacity of the charging station and the number of vehicles that may be using the charging station at any one time by dynamically allocating the charger units to charger points. Additionally, through use of a UI or similar device, it may provide more options to the operators of the vehicles using the charging station regarding charging time, cost, and other factors. The described charging station also allows for easier maintenance by, for example, permitting the replacement of portions of the charging station, such as the charger units, while the charging station is in operation as these portions may be deselected from use by the control unit.

In the foregoing description and in the accompanying drawings, specific terminology and drawing symbols have been set forth to provide a thorough understanding of the present invention. In some instances, the terminology and symbols may imply specific details that are not required to practice the invention. For example, the term "coupled" is used herein to express a direct connection as well as a connection through one or more intervening circuits or structures. Device or system "programming" may include, for example and without limitation, loading a control value into a register, one-time programmable-circuit (e.g., blowing fuses within a configuration circuit during device production) or other storage circuit within an integrated circuit device of the host system (or host device) and thereby control an operational aspect of the host system or establish a host system configuration. The terms "exemplary" and "embodiment" are used to express an example, not a preference or requirement. Signal paths that appear as single conductors may include multiple conductors and vice-versa, and components shown as being included within or forming part of other components may instead be disposed separately from such other components. With regard to flow diagrams and the like, the order of operations may be different from those shown and, where practical, depicted operations may be omitted and/or further operations added.

While the invention has been described with reference to specific embodiments thereof, it will be evident that various modifications and changes may be made thereto without departing from the broader spirit and scope. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of operation in an electric-vehicle charging station, the method comprising:
    determining respective maximum rates of charge to be delivered to a plurality of electric vehicles connected to the charging station, wherein the charging station has a total charging capacity; and
    allocating respective portions of the total charging capacity of the charging station to each of the plurality of electric vehicles, the respective portions being non-uniform and determined based, at least in part, on the respective maximum rates of charge to be delivered to the plurality of electric vehicles, wherein at least one of the plurality of electric vehicles is allocated a nonzero charging rate that is less than a requested vehicle charging rate of the at least one of the plurality of electric vehicles in response to a sum of requested vehicle charging rates of the plurality of electric vehicles exceeding the total charging capacity of the charging station.

2. The method of claim 1 wherein determining respective maximum rates of charge and allocating respective portions of the total charging capacity are performed by executing a sequence of operations in a control unit coupled to the charging station.

3. The method of claim 1 wherein determining respective maximum rates of charge comprises determining a maximum rate of charge based, at least in part, on a vehicle operator's selections from one or more dynamically generated charging options.

4. The method of claim 1 wherein determining respective maximum rates of charge comprises determining a maximum rate of charge based, at least in part, on stored reference data pertaining to rates of charge.

5. The method of claim 4 wherein the stored reference data comprises information accumulated while charging electric vehicles similar to one of more of the plurality of electric vehicles.

6. The method of claim 1 wherein determining respective maximum rates of charge comprises determining a maximum rate of charge based, at least in part, on automatic selection of a vehicle operator's charging preferences.

7. The method of claim 6 further comprising storing the vehicle operator's charging preferences in a portable storage device.

8. The method of claim 1 wherein determining respective maximum rates of charge comprises, at least in part, receiving information from the one or more of the plurality of electric vehicles.

9. The method of claim 1 wherein allocating respective portions of the total charging capacity further comprises determining the respective portions based, at least in part, on a previously determined charging priority for each vehicle.

10. The method of claim 9 wherein the previously determined priority is based, at least in part, on the price paid for the charge by a vehicle operator.

11. The method of claim 1 further comprising:
detecting a change in the determined respective maximum rates of charge; and
re-allocating respective portions of the total charging capacity of the charging station to each of the plurality electric vehicles based, at least in part, on the changed respective maximum rates of charge.

12. The method of claim 1, wherein the sum of the requested vehicle charging rates exceeds the total charging capacity of the charging station as a result of a change in demand from at least one other of the plurality of electric vehicles.

13. The method of claim 1, wherein allocating the respective portions of the total charging capacity of the charging station includes a first allocation of charger units, the first allocation of charger units having greater overall electrical efficiency than a second, unused, allocation of the charger units.

14. A method of operation in an electric-vehicle charging station, the method comprising:
receiving a request to charge a first vehicle at a first charging rate while charging a second vehicle at a second charging rate, wherein a sum of requested charging rates of vehicles charging at the electric-vehicle charging station, including the first charging rate and the second charging rate, exceeds a total charging capacity of the electric-vehicle charging station; and
reducing the second charging rate to a third, nonzero, charging rate to enable allocation of a portion of the total charging capacity of the electric-vehicle charging station to the first vehicle without exceeding the total charging capacity of the electric-vehicle charging station.

15. The method of claim 14 wherein reducing the second charging rate comprises reducing the second charging rate based, at least in part, on information collected from the operator of the second vehicle.

16. The method of claim 14, wherein the first charging rate is greater than the third charging rate as a result of a higher price for the first charging rate than the third charging rate.

17. The method of claim 14, wherein the first charging rate is greater than the third charging rate as a result of the first vehicle having participation in a membership program.

18. The method of claim 14, wherein the first charging rate is greater than the third charging rate as a result of the first vehicle having a greater frequency of use of the electric-vehicle charging station than the second vehicle.

19. The method of claim 14, further comprising:
allocating a plurality of charger units to provide the first charging rate and the third charging rate, wherein at least one of the first vehicle or the second vehicle has more than one of the plurality of charger units so allocated.

20. The method of claim 14, further comprising:
receiving the request from the first vehicle, via one of a charger point or a wireless mechanism.

* * * * *